United States Patent [19]

Karolyi

[11] Patent Number: 4,596,620
[45] Date of Patent: Jun. 24, 1986

[54] PROCESS AND APPARATUS FOR COVERING A CUT EDGE OF A CARDBOARD BLANK

[75] Inventor: Oskar Karolyi, Boll-Bad Boll, Fed. Rep. of Germany

[73] Assignee: Michael Horauf Maschinenfabrik GmbH & Co. KG, Sussen, Fed. Rep. of Germany

[21] Appl. No.: 630,113

[22] Filed: Jul. 12, 1984

[30] Foreign Application Priority Data

Jul. 29, 1983 [DE] Fed. Rep. of Germany ....... 3327462

[51] Int. Cl.⁴ .......................... B32B 3/04; B32B 31/00
[52] U.S. Cl. .................................... 156/216; 156/285; 156/293; 156/475; 156/479; 156/481; 156/489; 156/490
[58] Field of Search ................. 156/216, 293, 475–476, 156/479, 481, 489, 490, 285, 382

[56] References Cited

U.S. PATENT DOCUMENTS

| | | | |
|---|---|---|---|
| 2,936,816 | 5/1960 | Lang | 156/275.1 |
| 4,272,770 | 1/1981 | Bocca et al. | 156/447 X |
| 4,322,864 | 4/1982 | Bocca et al. | 156/468 |
| 4,481,053 | 11/1984 | Tokuno et al. | 156/156 |

Primary Examiner—Edward Kimlin
Assistant Examiner—Merrell C. Cashion, Jr.
Attorney, Agent, or Firm—Burns, Doane, Swecker & Mathis

[57] ABSTRACT

The open cut edge of a cardboard blank is covered by a cover strip folded around the cut edge. The cover strip is cut from a band having a width corresponding to the length of the cut edge to be covered. The strip is held flatly on a folding device and is subsequently folded around the cut edge of the cardboard blank. On the folding device a folding slit is provided which may be slid, together with the cover strip, over the cut edge of the cardboard blank in a direction transversely of such edge.

7 Claims, 6 Drawing Figures

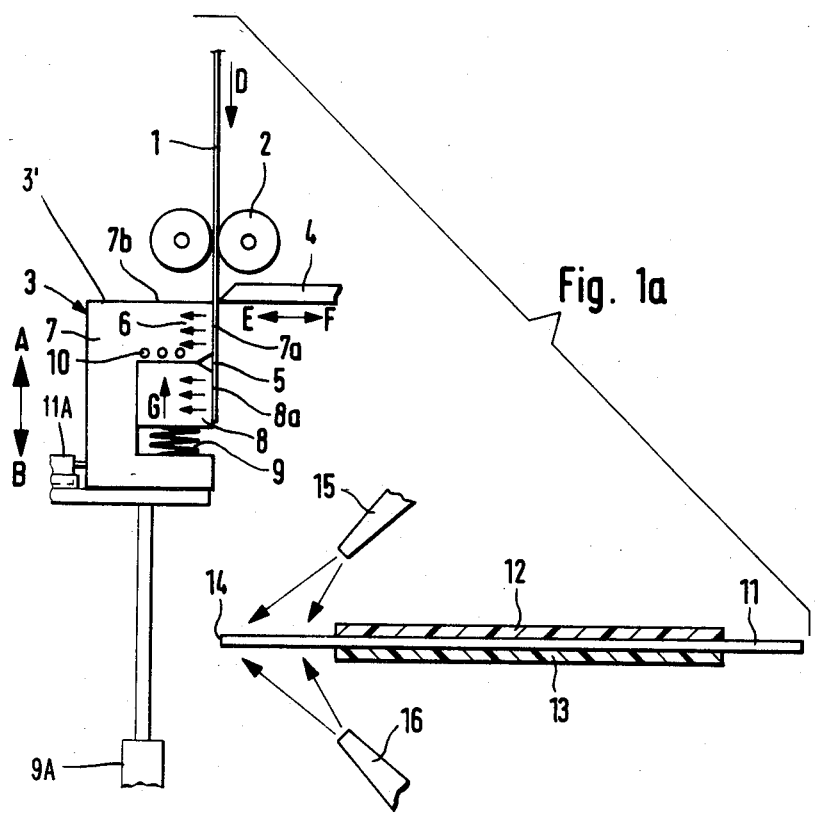

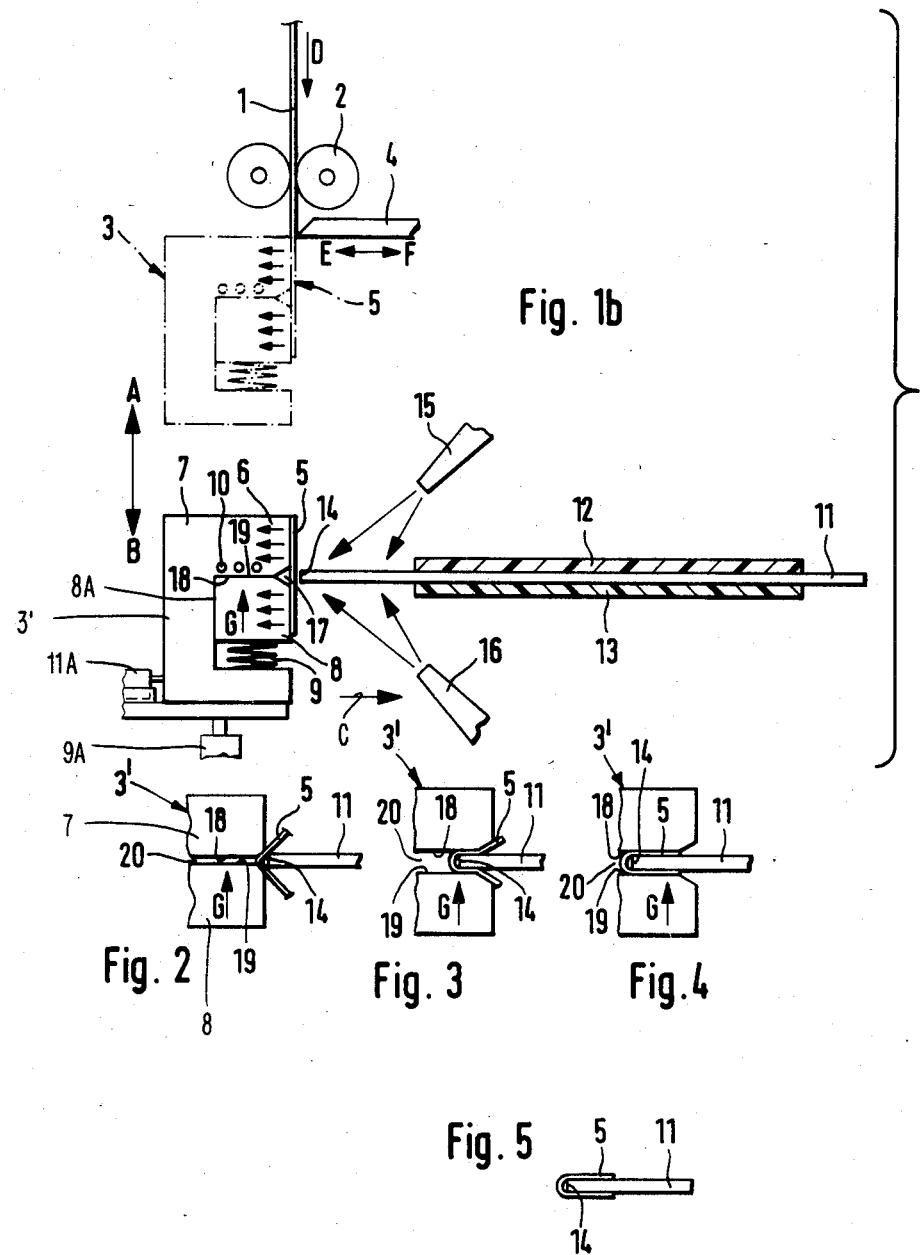

PROCESS AND APPARATUS FOR COVERING A CUT EDGE OF A CARDBOARD BLANK

BACKGROUND AND OBJECTS OF THE INVENTION

The invention concerns a process for the covering of an open cut edge of a cardboard blank coated at least on one side, by means of a cover strip that may be folded around the cut edge and bonded to the surfaces of the cardboard blank by heating and pressing.

Known are foldable boxes or cup-like containers formed of a cardboard blank having a surface protected by a coating at least on the side which is to form the inside of the container. There exists, however, the problem that the cut edges, in particular, the inner cut edges, are not surface protected by a coating. The later-inserted contents of the cup or the box may thus penetrate through the open cut edge and into the coardboard. For this reason, in a known process of the aforementioned type (disclosed in DE-OS No. 21 02 001) a certain protection is provided at least for the inner cut edge which comprises a separate strip of a flexible, impermeable, heat resistant material, in particular aluminum, which is folded around the edge to be protected and tightly bonded to the material of the blank on both surfaces.

In the known process a strip of the protecting material is (i) unwound from a storage roll, (ii) guided parallel to the cut edge of a cardboard blank to be protected, and then (iii) folded. The strip has a width corresponding to the intended width of the later-covered strip, i.e., approximately the double width of the fold.

This known process has the disadvantage that it is not simple to cut a cover strip with precision dimensions. The apparatus employed in the process is rather bulky as the result of the process steps succeeding each other, while the strip is still connected with the storage roll. The cut edge of the cardboard blank must have a minimum length to permit the folding of the cover strip around it. Due to the fact that the cardboard blank must be guided parallel to the strip, the process is not applicable universally to different types of blanks. For example, open cut edges of conical cups cannot be covered in this manner.

It is an object of the invention to simplify the process and the necessary apparatus, and in particular, to render it largely independent of the type of the coardboard blank to be protected.

SUMMARY OF THE INVENTION

The invention involves cutting the cover strip from a band the width of which corresponds to the length of the cut edge to be covered. The strip is placed flush against the cut edge to be covered and is folded around the cut edge of the cardboard blank by means of a feed motion oriented transversely to the strip surface.

In view of the fact that the width of the cover strip is already determined prior to the folding and is cut to a desired length, the strip is more readily adapted to the dimensions and the position of the cardboard blank to be protected.

The flush positioning of the cover strip against the cut edge places the strip in a favorable position for folding. It is no longer necessary for the cover strip drawn from the storage roll and the edge of a blank web to travel parallel to each other over an extended path. A simple transverse motion suffices for the folding. The process may thus be used to fold the edges of different shapes of edges and in particular may be employed both for cylindrical and conical wound containers or for folding boxes of any type.

In the preferred embodiment of the invention, it is provided that the cardboard blank and/or the cover strip are heated prior to folding by means of hot air, possibly several times. In this manner the rate of folding may be increased.

In a further advantageous embodiment of the invention, it is provided that the band is unwound perpendicularly to the surface of the flat aligned cardboard blank. The cover strip is maintained, during the cutting, in a flat aligned form and is then guided to the cut edge to be covered. The edge is located against the cover strip prior to the onset of the feed motion in the direction of the cut edge. This process is employed advantageously if a folding device is cooperating in a suitable manner with the cutting means, so that the cover strip cut to the necessary width may be held on the folding device. In view of the fact that the folding device is subsequently carried to the cardboard blank, the configuration of the blank may be varied even further.

An advantageous apparatus of the embodiment of the process according to the invention, comprises a folding device, a heating device, and means to press the folded cover strip against the cardboard blank. The folding device comprises two pressure surfaces extending parallel to each other and forming a folding slit, the height of which is adaptable to the thickness of the cardboard blank.

In its simplest form the folding device thus corresponds to a more or less cubic structural part containing a transverse slit, corresponding approximately to the thickness of the cardboard blank. When such a slit is slid over the open cut edge of the cardboard blank, with the cover strip disposed therebetween, folding is effected automatically without the need for additional means.

It is advantageous if the surfaces of the folding slit are yieldably biased together. This renders the folding slit adaptable to the thickness of different cardboard blanks. For example, the folding device may be employed in a manner so that the cut edge to be protected itself will force apart the surfaces forming the folding slit, against the force of a spring.

In a preferred embodiment of the invention, the folding device is displaceable over the blank in a direction transverse to the cut edge of the cardboard blank by a distance corresponding to at least one-half the length of the cover strip. In this manner, the cover strip is pressed over its entire length against the surfaces to be covered of the cardboard blank.

Advantageously, the folding device may be equipped with holding surfaces for folding the cover strip flatly against the cardboard, the holding surfaces extending perpendicularly to the folding slit. The holding surfaces may be perforated and connected with a source of negative pressure. In this fashion, the cover strip is held by the folding device itself and placed into the correct position with respect to the folding slit.

Advantageously, the folding device may be moved back and forth between two working positions. In one working position, the holding surfaces are located in front of the cut edge of the cardboard blank, with the edge aligned with the slit. This signifies that the cardboard blank is located in the same plane as the folding slit, with the folding slit itself and the cut edge of the cardboard blank being separated by the cover strip disposed perpendicularly between them. When subsequently the folding slit of the folding device is displaced transversely to the cardboard blank, the cover strip is folded exactly around the cut edge to be protected.

In an especially advantageous embodiment of the invention, the folding device is simultaneously a component of a cutting installation separating the cover strip from the band. The configuration in this case may be such that the folding device forms a quasi-stationary bottom blade which cooperates with a mobile upper blade. In this manner the cover strip held by the folding device is in the correct position for the subsequent folding process even during its separation from the band.

In a further development of the invention, at least one contact surface of the folding slit may be heated. As a rule, this is sufficient to transfer heat without further means over the folding slit. Alternatively, at least one hot air nozzle directed at the cover strip being held by the folding device is provided. By these means it is possible to preheat the cover strip to its folding around the cut edge to be protected.

To preheat the cardboard blank, a plurality of hot air nozzles directed at the cardboard blank may be provided. The latter are arranged appropriately along the transport path of the cardboard blank, which is being advanced in steps.

In a cooperation of the most favorable variants of the above-described apparatus, a number of folds of approximately 150 to 160 per minute may be achieved.

THE DRAWING

The objects and advantages of the invention will become apparent from the following detailed description of a preferred embodiment thereof in connection with the accompanying drawings in which like numerals designate like elements, and in which:

FIG. 1a shows a side elevational view of a folding mechanism according to the present invention located in one of two work stations, i.e., in position for the cutting of the cover strip;

FIG. 1b depicts the apparatus of FIG. 1a in the cutting position (broken lines) and in the folding position (solid lines); and FIGS. 2 to 5 depict individual work steps of the folding of the cover strip around the cut edge to be protected.

DETAILED DESCRIPTION OF A PREFERRED EMBODIMENT OF THE INVENTION

In a preferred apparatus shown in FIGS. 1a and 1b, a web or strip 1 is passed from a storage roll (not shown) in the direction of the arrow D by means of a pair of feeder rolls 2 to a folding device 3. The strip 1 has a width corresponding to the length of the cut edge to be covered. The folding device 3 carries a cutting edge 7b, serving as the bottom edge part of a cutting installation and is stationary during the cutting process. The cutting edge 7b cooperates with a cutting blade 4 mobile transversely of the direction of strip travel, i.e., in the direction of the arrows E and F in FIG. 1, which in each case cuts a strip 5 from a coiled strip 1 at a cutting station.

The folding device or strip handling device 3 comprises a housing 3' having an upper part 7 and a recess in which a bottom or movable part 8 is disposed. The movable part 8 is continuously biased in direction G toward the upper part 7 by means of a spring 9.

The folding device 3 also functions as a stripholding mechanism by imposing suction forces on the strip 5. The suction is applied to the strip through perforated holding surfaces 7a, 8a on the upper and lower parts 7, 8, respectively, along which the strip 5 travels. The suction can be imposed in various ways as will be evident to those skilled in the art. For example, a suction pump can be communicated with the interior of the housing 3' and thus with the upper surface 7a in the region 6. The suction can be transmitted to the movable part 8 through the interface between the movable part 8 and the housing 7. That is, an aperture in the housing 3' can communicate with a vertical slot in the movable part 8 to enable the latter to move vertically relative to the former without interrupting the suction at the surface 8a.

In an area of the upper part 7 located opposite the movable part 8, an induction heating device 10 is located, which heats the folding device 3, when needed, in a manner to be described in detail below.

It will be appreciated that certain modifications of the folding device can be effected without exceeding the scope of the invention. For example, the folding device 3 need not necessarily carry the bottom part 7b of a cutting installation, but may be separated structurally from the upper blade 4 and bottom blade 7b. Furthermore, it is not absolutely necessary for the suction air to flow through the holes in the above-described surfaces 7a, 8a; air may alternatively be drawn through a slit defined between the upper part 7 and the movable part 8. Still further, instead of pressuring the movable part 8 by means of a spring 9 against the upper part 7, appropriate drive gear controls may be provided. Finally, heating may be effected by means other than the induction heating 10, for example by heating the cover strip 5 with a heating cartridge or by blowing hot air from the outside over its entire surface, while being held on the folding device 3. However, the configuration shown is especially simple in its configuration.

The housing 3' is movable between upper and lower working positions by any suitable means, such as an air cylinder 9A.

FIGS. 1a and 1b show, respectively, the two work position stations of the folding device 3, which is movable in the directions of the arrow AB. In the upper position according to FIG. 1a, the bottom edge 7b cooperates with the upper blade 4. Following its transfer to the bottom position according to FIG. 1b, the folding device 3 performs a folding process wherein the cover strip 5 is folded around an open cut edge 14 of a flatly aligned cardboard blank 11. The cut edge 14 to be protected is oriented parallel to the lateral dimension of the cover strip 5 held on the folding device 3. In the process, the cardboard blank 11 is moved conveniently by a pair of plates or bands 12, 13 into a position favorable for folding and aligning at a strip applying station. The pair of bands 12, 13 clamps the cardboard blank 11 such that essentially only the area over which the cover strip 5 is subsequently to be folded, remains free.

During the feeding-in of the cardboard blank 11 (e.g., the blank is fed transversely to the direction of feed of the strip and perpendicularly to the plane of the drawing), the area of the cut edge 14 to be covered is impacted by hot air, as indicated by the hot air nozzles 15 and 16. The blowing of hot air may be effected at several work stations successively during the feeding of the cardboard blank 11 by the bands 12 and 13, whereby the rate of folding can be increased. The cover strip can also be heated by the nozzles.

It is seen in FIGS. 1a and 1b that the upper part 7 and the movable part 8 of the folding device 3 have two folding surfaces 18 and 19 disposed parallel to each other, together forming a folding slit 20 (FIGS. 2 to 4). This folding slit 20 tends to be closed as the movable part 8 is pressed against the upper part 7 by the spring 9.

In the folding position (FIG. 1b), the folding device 3 has been placed perpendicularly in front of the surface of the cardboard blank 11 by the movement in the direction B. Subsequently, the folding device 3 is pushed in the direction of the arrow C by means of a fluid cylinder 11A with the folding slit 20 aligned with the open cut edge 14 of the cardboard blank 11. The cardboard blank 11 is separated from the folding device 3 by the cover strip 5, which is located in a plane perpendicular to both the folding slit 20 and the cardboard blank 11. The folding slit 20 is beveled at its front end 17 so that the cardboard blank 11 is able to separate the movable part 8 of the folding device 3 from the upper part 7 in response to the folding device 3 being slid onto the cardboard blank 11 in the direction of the arrow C.

The folding process is shown in detail, schematically in FIGS. 2 to 5. In the course of the folding process the cover strip 5 is preheated by the induction heater 10, while the cardboard blank 11 had been preheated during its advance in several stations. The cardboard blank 11 is coated, for example on both sides, with polyethylene whereby a sealing process may take place even during the folding, whereby the cover strip 5 is fixedly bonded to the cardboard blank 11.

During the folding process itself depicted in FIGS. 2 to 4, the upper part 7 and the movable part 8 of the folding device 3 are constantly pressed toward each other by the spring 9 in the direction of the arrow G. Optionally, separate pressure elements may be present, acting from the outside onto the upper part 7 and the bottom part 8. As the blank 11 enters the beveled portion 17 of the slit 20, the center of the cover strip 5 is bent outwardly, causing the upper and lower ends of the strip to approach the blank 11. As the blank further enters the slit 20, pushing away the movable part 8 in so doing, the surfaces 18, 19 push the cover strip against the upper and lower faces of the blank 11. Eventually, the strip 5 is fully folded around the blank (FIGS. 4, 5). The folding device is pushed in the direction of arrow C by an extent equal to one-half the strip length.

The cover strip 5 is thereby placed in a simple manner around the open cut edge 14 of the cardboard blank 11, pressed-on and simultaneously sealed. When the folding device 3 subsequently is returned in a direction opposite to the arrow C, the cut edge 14 of the cardboard blank 11 has been covered by a cover strip 5, as depicted in FIG. 5.

The apparatus described permits a number of cycles of up to 160 per minute and may be adapted to very different types of cardboard blanks 11. If a different length of a cut edge is to be covered, it is merely necessary to insert a storage roll 1 of a different width. The transport bands 12 and 13 are capable of introducing different types of blanks so that the cut edge 14 is always aligned with the folding slit 20. It may be seen that the process described herein is very simple and the apparatus required is economical in design and highly space-saving.

Although the present invention has been described in connection with a preferred embodiment thereof, it will be appreciated by those skilled in the art that additions, deletions, modifications, and substitutions may be made without departing from the spirit and scope of the invention as defined in the appended claims.

What is claimed is:

1. An apparatus for covering a cut edge of a cardboard blank of the type which has been protectively coated on at least one side, said apparatus comprising:
   a cutting station to which a web of strip material is fed,
   a strip handling device comprising:
      first and second parallel, mutually facing folding surfaces defining a slit therebetween,
      first and second holding surfaces disposed on opposite sides of said slit and oriented perpendiculary relative thereto, said holding surfaces receiving said strip material thereagainst so that said strip material extends across said slit, and
      means for transmitting suction to said holding surfaces for holding said strip material thereagainst,
   cutting means for cutting a strip from said strip material at said cutting station, with said strip remaining held against said holding surfaces by said suction during said cut and extending across said slit,
   a strip-applying station including means for positioning the cardboard blank,
   first moving means for moving said strip handling device and said strip carried thereby to said strip applying station in a direction transversely relative to the plane of the blank so that a cut edge of said blank is aligned with said slit,
   heating means for heating at least one of said strip and said blank, and
   second moving means for inserting said cut edge into said slit with said strip disposed therebetween, to cause said folding surfaces to fold said strip onto said blank around said edge.

2. Apparatus according to claim 1 including means yieldably biasing said folding surfaces toward one another.

3. Apparatus according to claim 1, wherein said second moving means comprises means for displacing said strip handling device toward said cutting edge in a direction transversely thereof by a distance of at least one-half the length of said strip.

4. Apparatus according to claim 1 wherein said heating means includes nozzle means for directing heated air toward said strip as the latter is held by said handling device.

5. Apparatus according to claim 1, wherein said first moving means moves said strip handling device in a direction perpendicular relative to the plane of said blank.

6. A process for covering a cut edge of a cardboard blank of the type which has been protectively coated on at least one side, said process comprising the steps of:
   positioning at a cutting station a strip handling device having a slit and a pair of holding surfaces disposed on opposite sides of said slit and oriented perpendicularly relative thereto,
   arranging an end of a web of strip material against said holding surfaces so as to extend across said slit,
   creating suction at said holding surfaces to hold said strip material thereagainst,
   cutting said strip material while holding said strip material against said holding surfaces by said suction to form a strip which remains held against said holding surfaces and extends across said slit, moving said strip handling device and said strip carried thereby to a strip applying station in a direction transversely relative to the plane of the blank to align said slit with the edge of the cardboard blank positioned at said strip applying station, heating at least one of said strip and said blank, and causing said edge to enter said slit with said strip disposed therebetween so that said strip is folded onto said blank around said edge.

7. A process according to claim 6, wherein said moving step comprises moving said strip holding device perpendicularly relative to the plane of said blank.

* * * * *